United States Patent [19]

Rishel et al.

[11] Patent Number: 5,183,330
[45] Date of Patent: Feb. 2, 1993

[54] LIGHTING FIXTURE WITH LAMP HOLDER INCLUDING INTEGRAL RESILIENT FINS

[75] Inventors: Michael Rishel; Larry Powers, both of Hanover, Pa.; Claude Barozzini, Annandale, N.J.

[73] Assignee: The Genlyte Group Incorporated, Secaucus, N.J.

[21] Appl. No.: 728,591

[22] Filed: Jul. 11, 1991

[51] Int. Cl.⁵ ............................................. F21V 21/14
[52] U.S. Cl. .................................. 362/372; 362/419; 362/285
[58] Field of Search ............ 362/306, 372, 390, 418, 362/419, 429, 373, 294, 96, 285, 288, 364

[56] References Cited

U.S. PATENT DOCUMENTS

| | | | |
|---|---|---|---|
| 2,593,171 | 4/1952 | Morse | 362/267 |
| 2,782,295 | 2/1957 | Schwenkler | 362/372 |
| 3,803,400 | 4/1974 | Ozawa | 362/372 |
| 4,070,567 | 1/1978 | Crompton | 362/390 |
| 4,142,227 | 2/1979 | Aikens | 362/364 |
| 4,319,312 | 3/1982 | DeVos et al. | 362/310 |
| 4,445,163 | 4/1984 | Ziaylek, Jr. | 362/61 |
| 4,658,335 | 4/1987 | Culler | 362/80 |
| 4,858,877 | 8/1989 | Carter | 248/545 |
| 4,947,307 | 8/1990 | Quiogne | 362/325 |
| 4,972,301 | 11/1990 | Kasboske | 362/61 |
| 5,086,379 | 2/1992 | Denison et al. | 362/145 |

Primary Examiner—Richard R. Cole
Attorney, Agent, or Firm—Kane, Dalsimer, Sullivan, Kurucz, Levy, Eisele and Richard

[57] ABSTRACT

A lighting fixture for use as a spotlight is provided. A lamp holder with radially extending resilient fins is inserted into a cylindrical body which may be made of PVC pipe. The frictional engagement of the radially extending resilient fins against the interior wall of the cylindrical body allows the height and angular orientation of the lamp holder to be adjusted.

25 Claims, 2 Drawing Sheets

LIGHTING FIXTURE WITH LAMP HOLDER INCLUDING INTEGRAL RESILIENT FINS

BACKGROUND OF THE INVENTION

1. Field of the Invention

This invention pertains to lighting fixtures, particularly spotlights mounted in the ground, which include a lamp holder with integral resilient fins frictionally engaged within the interior of a cylindrical pipe-like housing. The frictional engagement of the resilient fins allows for the simple angular rotation and height adjustment of the lamp holder within the cylindrical pipe-like housing.

2. Description of the Prior Art

Lighting fixtures such as spotlights, including ground-mounted spotlights, are well-known in the prior art for landscaping enhancement and similar purposes. It is frequently desirable to have the body of the spotlight assembly in a fixed position, such as mounted in the ground, while allowing the lamp holder to be adjustable in both height and angle to allow the light to be directed in different directions. However, heretofore, prior art lighting fixtures and spotlights have included lamp holders which are adjustable within the fixed assembly by the use of mechanical connections such as gimbal rings or swivel means. Many of these configurations have provided an angle but not a height adjustment. Further, such configurations are deficient due to increased manufacturing costs and exposed metal-to-metal contacts which can cause corrosion.

It is further desirable to have a lamp holder which is waterproof, particularly for outdoor applications. However, it is further desirable to have a lamp holder which can accommodate a variety of bulb shapes and remain unaffected by rainfall and other moisture impinging thereupon.

OBJECTS AND SUMMARY OF THE INVENTION

It is therefore an object of this invention to provide a lighting fixture such as a spotlight with a body in a fixed location and a lamp holder with an adjustable height and angular orientation.

It is therefore a further object of this invention to provide a lighting fixture such as a spotlight with a lamp holder with an adjustable height and angular orientation which is free of fixed mechanical configurations between the body and the lamp holder.

It is therefore a still further object of this invention to provide a lighting fixture such as a spotlight with a lamp holder with a minimum of exposed metal or metal-to-metal contacts.

It is therefore a final object of this invention to provide a lighting fixture such as a spotlight which can accommodate a variety of bulbs while remaining unaffected by water.

The preferred embodiment disclosed herein of the lighting fixture of the present invention includes a body which is cylindrically shaped (such as PVC pipe) with a partially oblique truncated front end and a squarely cut rear end. A silicone rubber lamp holder with resilient integral rubber fins is inserted into the partially oblique truncated end of the cylindrical body. The resilient integral rubber fins frictionally engage the interior of the cylindrical body thereby securing the lamp holder in place yet allowing a user to adjust the angular rotation or height of the lamp holder within the cylindrical body. This invention is also broadly applicable to numerous other lighting fixtures such as tracklights, downlights and automobile headlights.

The lamp holder, being made of silicone rubber, can engage a bulb and the associated electrical terminals tightly in a waterproof manner. An electrical wire runs from the electrical terminals, through an aperture in the rear of the lamp holder, and through the rear end of the cylindrical body. The walls of the aperture of the lamp holder tightly engage the electrical wire passing therethrough so as to be watertight.

The rear of the lamp holder further includes a nipple adjacent to the electrical wire aperture. This nipple is usually sealed but can be snipped by the user to provide for water drainage if an unconventional or oddly shaped bulb is used within the lamp holder so as to impair the normally watertight seal between the edge of the exposed bulb and the lip of the lamp holder.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
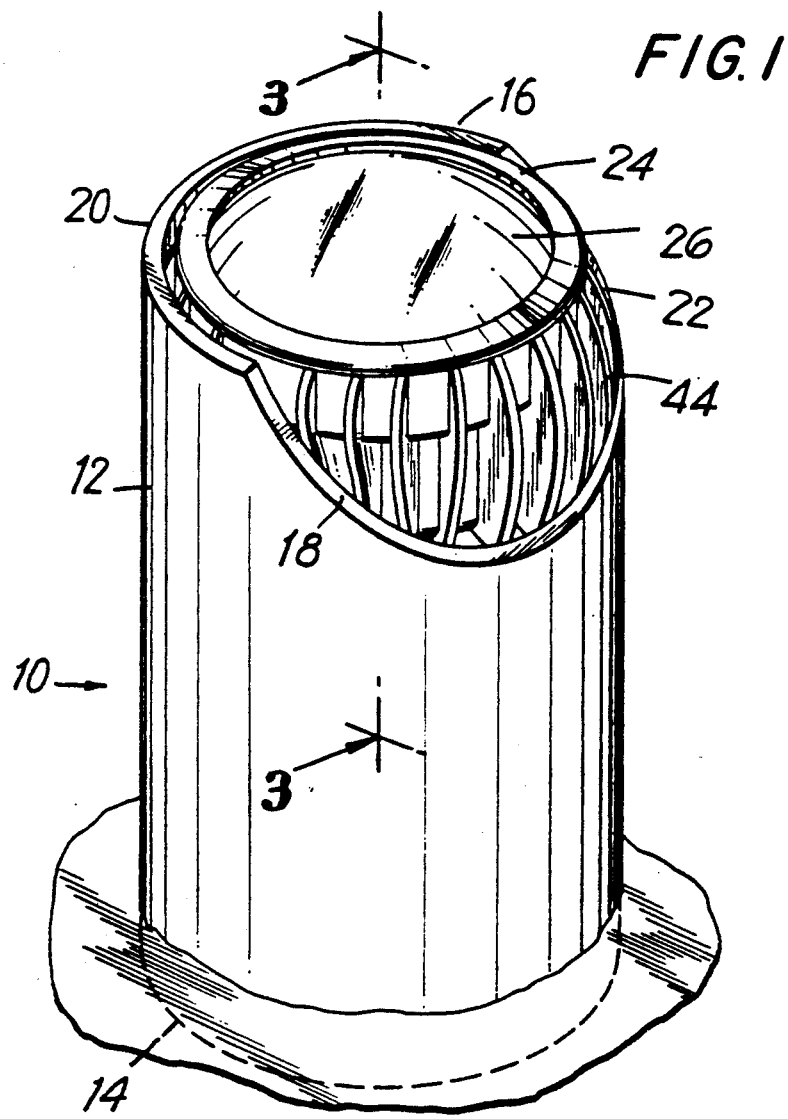
FIG. 1 is a perspective view of the lighting fixture of the present invention.
Figure 2:
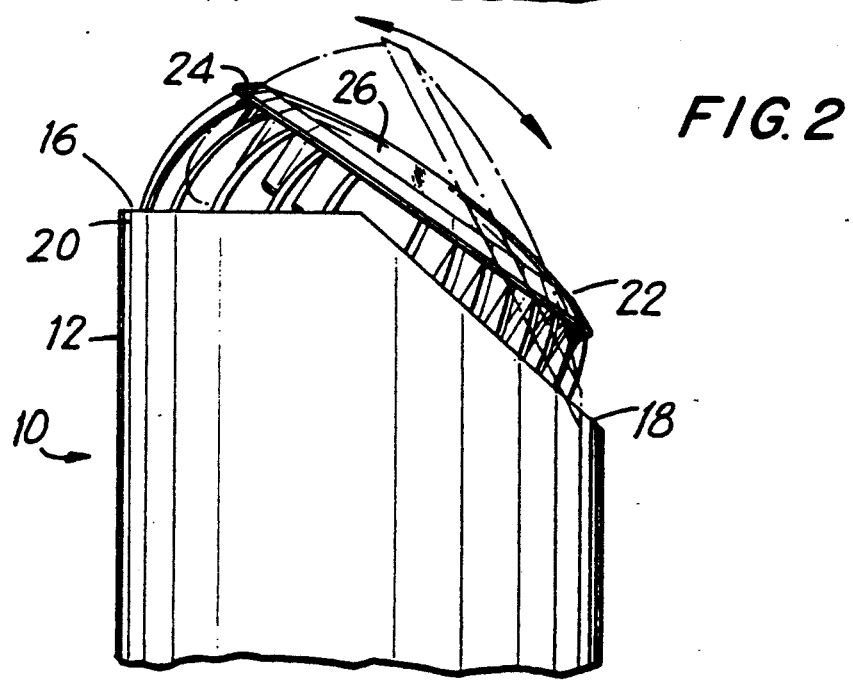
FIG. 2 is a side plan view, partly in elevation, of the lighting fixture of the present invention, showing in phantom the rotational adjustability of the lamp holder thereof.
Figure 3:
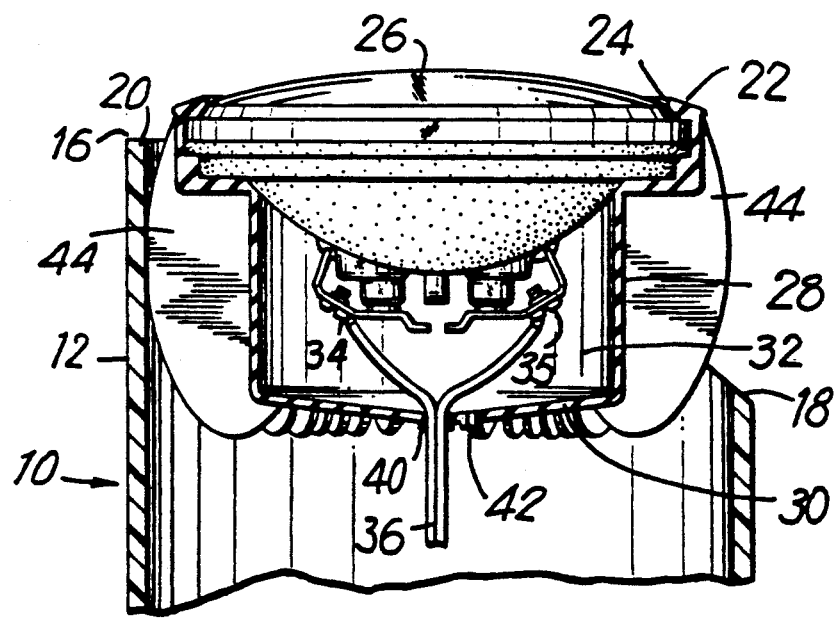
FIG. 3 is a cross-sectional view along plane 3—3 of FIG. 1.
Figure 4:
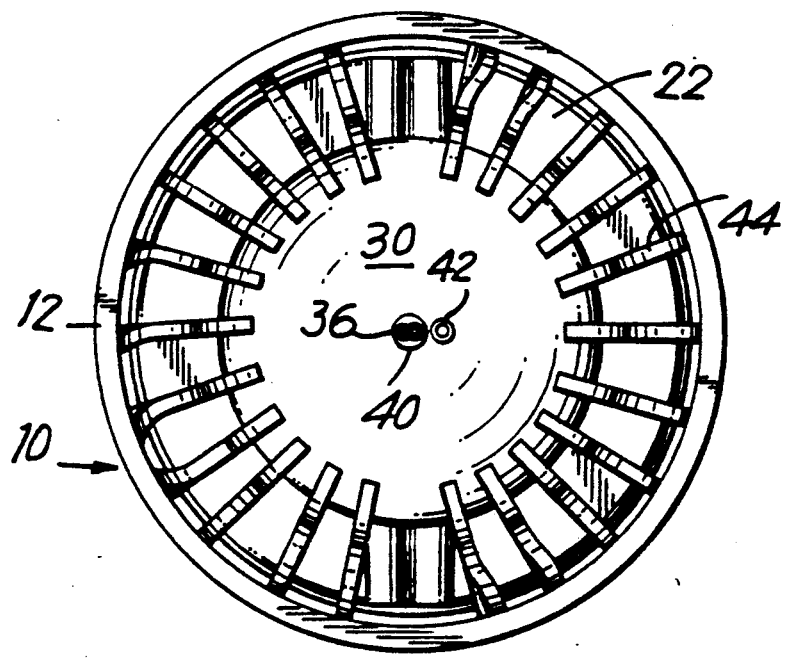
FIG. 4 is a bottom plan view of the lighting fixture of the present invention.

Referring now to the drawings in detail wherein like numerals indicate like elements throughout the several views, FIG. 1 is a perspective view of lighting fixture 10. Body 12 has a cylindrical shape and is preferably a piece of pipe, particularly PVC pipe. Body 12 is typically secured into the ground for landscaping lighting but can be fixed into other locations. Body 12 includes rear end 14 which is squarely cut in relation to the longitudinal axis of body 12. Body 12 further includes front end 16 with obliquely truncated portion 18 and squarely cut portion 20. Lamp holder 22 is inserted within front end 16 of body 12. Lamp holder 22 is made of silicone rubber and includes lip 24 which tightly engages bulb 26 with a waterproof seal. As shown in FIG. 3, cylindrical wall 28 extends downwardly from lip 24 to lower wall 30 thereby forming chamber 32 in which the electrical connections from terminals 34, 35 of bulb 26 to electrical wire 36. Electrical wire 36 passes through aperture 40 in lower wall 28 and through rear end 14 of body 12 to a power source (not shown). Aperture 40 is sized and shaped so that electrical wire 36 passes therethrough forming a water-tight seal therebetween. As shown in FIG. 4, nipple 42 is formed adjacent to aperture 40. Nipple 42 is supplied as a watertight protuberance but can be snipped by the user to provide a drainage outlet if an undersized or oddly shaped bulb 26 is used thereby degrading the watertight seal between lip 24 and bulb 26.

Lamp holder 22 includes radially extending integral resilient fins 44 extending from lip 24, cylindrical wall 28 and lower wall 30. Resilient fins 44, as shown in FIG.

3, form the intermediate latitudinal portion of a sphere. When lamp holder 22 is inserted into body 12, resilient fins 44 frictionally engage the internal walls of body 12 and hold lamp holder 22 in place. However, the resilience of fins 44 allows a user to adjust both the angular orientation and the height of lamp holder 22 within body 12.

To use lighting fixture 10, the user first installs bulb 26 into lamp holder 22 by passing electrical wire 36 through aperture 40 of lower wall 30 and attaching electrical wire 36 to terminals 34 and 35 of bulb 26. The user then places the periphery of bulb 26 into lip 24 and pulls wire 36 so to remove any slack from within chamber 32. If not already done, the user passes wire 36 through rear end 14 of body 12 and attaches wire 36 to a power source (not shown). If lip 24 and bulb 26 do not form a watertight seal, the user may snip nipple 42 to form a drainage opening from chamber 32. The user then inserts lamp holder 22 into body 12 so that resilient fins 44 frictionally engage the interior of body 12. The user then adjusts the height and orientation of lamp holder 22 within body 12. Obviously, some of the above steps may be reversed in order, or even eliminated under the appropriate circumstances.

This invention is also broadly applicable to numerous other lighting fixtures such as tracklights, downlights and automobile headlights.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

We claim:

1. A lighting fixture including;
   a lamp holder;
   a cylindrical body into which said lamp holder is inserted;
   said lamp holder including bulb engaging means; electrical power receiving means; and axial and rotational positioning means on an exterior of said lamp holder frictionally engaging said cylindrical body, whereby said frictional engagement is such that when said cylindrical body is in a final position said lamp holder is adjustably retained by said cylindrical body so as to allow for axial and rotational movement thereof.

2. The lighting fixture of claim 1 further including drainage means between said lamp holder and said cylindrical body.

3. The lighting fixture of claim 2 wherein said bulb engaging means includes a resilient lip and wherein the lighting fixture further includes a wall downwardly extending from said resilient lip thereby forming a chamber into which said electrical power receiving means is at least partially inserted.

4. The lighting fixture of claim 3 wherein said electrical power receiving means includes means to provide an aperture in said chamber adapted for an electrical wire to pass therethrough.

5. The lighting fixture of claim 4 wherein said positioning means includes radially extending resilient protuberances.

6. The lighting fixture of claim 5 wherein said radially extending protuberances form substantially a portion of a sphere.

7. The lighting fixture of claim 5 wherein said radially extending resilient protuberances form substantially an intermediate latitudinal portion of a sphere.

8. A lighting fixture including a lamp holder and a support means, said lamp holder including bulb engaging means; electrical power receiving means proximate to said bulb engaging means; and axial and rotational positioning means on an exterior of said lamp holder including radially extending resilient fins frictionally engaging said support means, whereby said frictional engagement is such that when said support means is in a final position said lamp holder is adjustably retained by said support means so as to allow for axial and rotational movement thereof.

9. The lighting fixture of claim 8 wherein said bulb engaging means includes a resilient lip and wherein the lighting fixture further includes a wall downwardly extending from said resilient lip thereby forming a chamber into which said electrical power receiving means is at least partially inserted.

10. The lighting fixture of claim 9 wherein said electrical power receiving means includes an aperture in said chamber adapted for an electrical wire to pass therethrough.

11. The lighting fixture of claim 10 wherein edges of said radially extending resilient fins form substantially a portion of sphere.

12. The lighting fixture of claim 11 wherein said support means comprises a cylindrical body into which said lamp holder is inserted thereby frictionally engaging said radially extending resilient fins within an interior portion of said cylindrical body.

13. The lighting fixture of claim 10 wherein edges of said radially extending resilient fins form substantially an intermediate latitudinal portion of a sphere.

14. A lighting fixture including a lamp holder, said lamp holder including bulb engaging means; electrical power receiving means proximate to said bulb engaging means; and positioning means on an exterior of said lamp holder including radially extending resilient fins with edges forming substantially a portion of a sphere;
   a cylindrical body into which said lamp holder is inserted thereby frictionally engaging said radially extending resilient fins within an interior portion of said cylindrical body wherein a front end of said cylindrical body includes portion cut obliquely to a longitudinal axis of said cylindrical body;
   wherein said bulb engaging means includes a resilient lip and wherein the lighting fixture further includes a wall downwardly extending from said resilient lip thereby forming a chamber into which said electrical power receiving means is at least partially inserted;
   wherein said electrical power receiving means includes means to provide an aperture in said chamber adapted for an electrical wire to pass therethrough.

15. The lighting fixture of claim 14 further including a bulb within said bulb receiving means, said bulb including terminals operatively connected to an electrical wire which passes through said aperture.

16. The lighting fixture of claim 14 wherein said body is formed of PVC pipe.

17. The lighting fixture of claim 14 wherein said lamp holder is formed of silicone rubber.

18. A lighting fixture including a lamp holder, said lamp holder including bulb engaging means; electrical power receiving means proximate to said bulb engaging means; and positioning means on an exterior of said lamp holder including radially extending resilient fins with edges forming substantially a portion of a sphere;

a cylindrical body into which said lamp holder is inserted thereby frictionally engaging said radially extending resilient fins within an interior portion of said cylindrical body;

wherein said bulb engaging means includes a resilient lip and wherein the lighting fixture further includes a wall downwardly extending from said resilient lip thereby forming a chamber into which said electrical power receiving means is at least partially inserted, said chamber further including a selectable drainage means;

wherein said electrical power receiving means includes means to provide an aperture in said chamber adapted for an electrical wire to pass therethrough.

19. The lighting fixture of claim 18 wherein said selectable drainage means includes a downwardly extending protuberance which forms an opening when cut.

20. The lighting fixture of claim 15 wherein said downwardly extending protuberance is adjacent to said aperture.

21. A lighting fixture including;
a lamp holder;
a cylindrical body into which said lamp holder is inserted;
said lamp holder including bulb engaging means; electrical power receiving means; and axial and rotational positioning means on an exterior of said lamp holder including radially extending resilient fins frictionally engaging said cylindrical body, whereby said frictional engagement is such that when said cylindrical body is in a final position said lamp holder is adjustably retained by said cylindrical body so as to allow for axial and rotational movement thereof.

22. The lighting fixture of claim 21 wherein said bulb engaging means includes a resilient lip and wherein the lighting fixture further includes a wall downwardly extending from said resilient lip thereby forming a chamber into which said electrical power receiving means is at least partially inserted.

23. The lighting fixture of claim 22 wherein said electrical power receiving means includes means to provide an aperture in said chamber adapted for an electrical wire to pass therethrough.

24. The lighting fixture of claim 23 wherein said radially extending resilient fins form substantially a portion of a sphere.

25. The lighting fixture of claim 23 wherein said radially extending resilient fins form substantially an intermediate latitudinal portion of a sphere.

* * * * *

UNITED STATES PATENT AND TRADEMARK OFFICE
CERTIFICATE OF CORRECTION

PATENT NO. : 5,183,330

DATED : February 2, 1993

INVENTOR(S) : Rishel et al.

It is certified that error appears in the above-identified patent and that said Letters Patent is hereby corrected as shown below:

Col. 5, line 22, change "15" to -- 19 --.

Signed and Sealed this

Twenty-sixth Day of October, 1993

Attest:

BRUCE LEHMAN

*Attesting Officer*　　　*Commissioner of Patents and Trademarks*